United States Patent
Shih

(10) Patent No.: US 9,442,277 B1
(45) Date of Patent: Sep. 13, 2016

(54) WIDE-ANGLE LENS

(71) Applicant: Po-Yuan Shih, Taichung (TW)

(72) Inventor: Po-Yuan Shih, Taichung (TW)

(73) Assignees: AO Ether Optronics (Shenzhen) Limited, Shenzhen, Guangdong Province (CN); AO Ether Corporation, Taichung (TW)

( * ) Notice: Subject to any disclaimer, the term of this patent is extended or adjusted under 35 U.S.C. 154(b) by 0 days.

(21) Appl. No.: 14/999,378

(22) Filed: May 2, 2016

(30) Foreign Application Priority Data

May 12, 2015 (TW) .............................. 104115095 A

(51) Int. Cl.
| | |
|---|---|
| *G02B 13/18* | (2006.01) |
| *G02B 3/02* | (2006.01) |
| *G02B 9/64* | (2006.01) |
| *G02B 13/04* | (2006.01) |
| *G02B 27/00* | (2006.01) |
| *G02B 13/00* | (2006.01) |
| *G02B 5/00* | (2006.01) |
| *G02B 3/04* | (2006.01) |

(52) U.S. Cl.
CPC .............. *G02B 13/18* (2013.01); *G02B 13/04* (2013.01); *G02B 3/04* (2013.01); *G02B 5/005* (2013.01); *G02B 9/64* (2013.01); *G02B 13/002* (2013.01); *G02B 13/0045* (2013.01); *G02B 27/0025* (2013.01)

(58) Field of Classification Search
CPC G02B 13/0045; G02B 27/0025; G02B 9/64; G02B 13/18; G02B 13/04; G02B 3/04; G02B 5/005; G02B 13/002

USPC .................. 359/708, 713, 740, 751, 755
See application file for complete search history.

(56) References Cited

U.S. PATENT DOCUMENTS

| 4,540,249 A | * | 9/1985 | Mogami | ................ G02B 15/14 359/680 |
| 2009/0052057 A1 | * | 2/2009 | Lin | ........................ G02B 13/06 359/751 |
| 2015/0009578 A1 | | 1/2015 | Shinohara et al. | |

FOREIGN PATENT DOCUMENTS

| CN | 204314533 U | 5/2015 |
| TW | 201235732 A | 9/2012 |

* cited by examiner

*Primary Examiner* — Evelyn A Lester
(74) *Attorney, Agent, or Firm* — McClure, Qualey & Rodack, LLP

(57) ABSTRACT

A wide-angle lens includes a first lens, a second lens, a third lens, a fourth lens, a fifth lens, a sixth lens and a seventh lens, all of which are arranged in sequence from an object side to an image side along an optical axis. The first, second lens are convex-concave lenses with negative refractive power and include a convex surface facing the object side and a concave surface facing the image side respectively. The third lens is with positive refractive power and includes a convex surface facing the image side. The fourth, seventh lens are biconvex lenses. The fifth, sixth lens are with refractive power. The fifth lens and the sixth lens satisfy: $-10 < f_{56}/f < -2$ wherein $f_{56}$ is an effective focal length of a combination of the fifth lens and the sixth lens, and f is an effective focal length of the wide-angle lens.

11 Claims, 16 Drawing Sheets

WIDE-ANGLE LENS

BACKGROUND OF THE INVENTION

1. Field of the Invention

The invention relates to a wide-angle lens.

2. Description of the Related Art

Nowadays, lenses used for vehicles and extreme sports have been continuously developed toward wide field of view. However, variations of the ambient temperatures of lenses used for vehicles and extreme sports are comparative large. Therefore, these lenses are required to have the ability of resistance to variations of the ambient temperature as well as wide field of view. The well-known wide-angle lens is not perfect and still needs improvement in order to meet the requirements of wide field of view and resistance to variations of the ambient temperature simultaneously.

BRIEF SUMMARY OF THE INVENTION

The invention provides a wide-angle lens to solve the above problems. The wide-angle lens of the invention is provided with characteristics of a wider field of view, a resistance to environment temperature variation, and a good optical performance and can meet a requirement of resolution.

The wide-angle lens in accordance with an exemplary embodiment of the invention includes a first lens, a second lens, a third lens, a fourth lens, a fifth lens, a sixth lens and a seventh lens, all of which are arranged in sequence from an object side to an image side along an optical axis. The first lens is a convex-concave lens with negative refractive power and includes a convex surface facing the object side and a concave surface facing the image side. The second lens is a convex-concave lens with negative refractive power and includes a convex surface facing the object side and a concave surface facing the image side. The third lens is with positive refractive power and includes a convex surface facing the image side. The fourth lens is a biconvex lens with positive refractive power. The fifth lens and the sixth lens are with refractive power. The seventh lens is a biconvex lens with positive refractive power. The fifth lens and the sixth lens satisfy: $-10 < f_{56} < -2$ wherein $f_{56}$ is an effective focal length of a combination of the fifth lens and the sixth lens, and f is an effective focal length of the wide-angle lens.

In another exemplary embodiment, the fifth lens and the sixth lens are cemented to form a cemented lens.

In yet another exemplary embodiment, the first lens satisfies $5 < Vd_1/Nd_1 < 25$, wherein $Vd_1$ is an Abbe number of the first lens and $Nd_1$ is an index of refraction of the first lens.

In another exemplary embodiment, the fourth lens satisfies $15 < Vd_4/Nd_4 < 45$, wherein $Vd_4$ is an Abbe number of the fourth lens and $Nd_4$ is an index of refraction of the fourth lens.

In yet another exemplary embodiment, the sixth lens satisfies $5 < Vd_6/Nd_6 < 60$, wherein $Vd_6$ is an Abbe number of the sixth lens and $Nd_6$ is an index of refraction of the sixth lens.

In another exemplary embodiment, the fourth lens satisfies $-10 < (R_{41} - R_{42})/(R_{41} + R_{42}) < 18$, wherein $R_{41}$ is a radius of curvature of an object side surface of the fourth lens and $R_{42}$ is a radius of curvature of an image side surface of the fourth lens.

In yet another exemplary embodiment, the fifth lens satisfies $1 < (R_{51} - R_{52})(R_{51} + R_{52}) < 10$, wherein $R_{51}$ is a radius of curvature of an object side surface of the fifth lens and $R_{52}$ is a radius of curvature of an image side surface of the fifth lens.

In another exemplary embodiment, the first lens, the second lens, the third lens, the fourth lens, the fifth lens, the sixth lens and the seventh lens are made of glass material.

In yet another exemplary embodiment, the wide-angle lens further includes a stop disposed between the third lens and the fourth lens.

In another exemplary embodiment, the fifth lens is a biconvex lens with positive refractive power and the sixth lens is a biconcave lens with negative refractive power.

In yet another exemplary embodiment, the fifth lens is a biconcave lens with negative refractive power and the sixth lens is a biconvex lens with positive refractive power.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
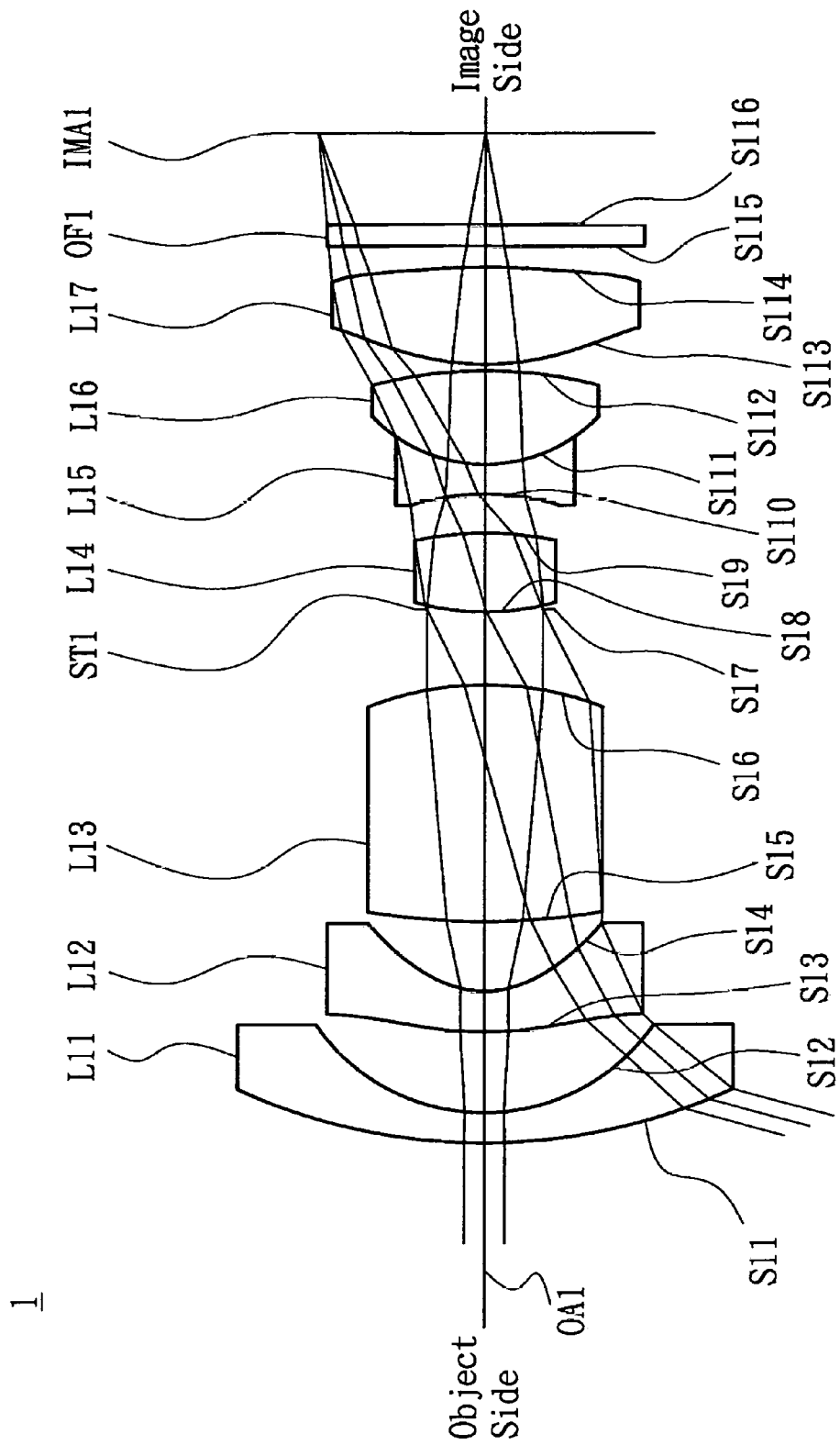
FIG. 1 is a lens layout and optical path diagram of a wide-angle lens in accordance with a first embodiment of the invention.

Referring to FIG. 1, FIG. 1 is a lens layout and optical path diagram of a wide-angle lens in accordance with a first embodiment of the invention. The wide-angle lens 1 includes a first lens L11, a second lens L12, a third lens L13, a stop ST1, a fourth lens L14, a fifth lens L15, a sixth lens L16, a seventh lens L17 and an optical filter OF1, all of which are arranged in sequence from an object side to an image side along an optical axis OA1. In operation, an image of light rays from the object side is formed at an image plane IMA1. The first lens L11 is a convex-concave lens with negative refractive power and made of glass material, wherein the object side surface S11 is a convex surface, the image side surface S12 is a concave surface and both of the object side surface S11 and image side surface S12 are spherical surfaces. The second lens L12 is a convex-concave lens with negative refractive power and made of glass material, wherein the object side surface S13 is a convex surface, the image side surface S14 is a concave surface and both of the object side surface S13 and image side surface S14 are aspheric surfaces. The third lens L13 is a biconvex lens with positive refractive power and made of glass material, wherein both of the object side surface S15 and image side surface S16 are spherical surfaces. The fourth lens L14 is a biconvex lens with positive refractive power and made of glass material, wherein both of the object side surface S18 and image side surface S19 are spherical surfaces. The fifth lens L15 is a biconcave lens with negative refractive power and made of glass material, wherein both of the object side surface S110 and image side surface S111 are spherical surfaces. The sixth lens L16 is a biconvex lens with positive refractive power and made of glass material, wherein both of the object side surface S111 and image side surface S112 are spherical surfaces. The image side surface S111 of the fifth lens L15 and the object side surface S111 of the sixth lens L16 are cemented to form a cemented lens. The seventh lens L17 is a biconvex lens with positive refractive power and made of glass material, wherein both of the object side surface S113 and image side surface S114 are aspheric surfaces. Both of the object side surface S115 and image side surface S116 of the optical filter OF1 are plane surfaces.

In order to maintain excellent optical performance of the wide-angle lens in accordance with the first embodiment of the invention, the wide-angle lens 1 must satisfies the following six conditions:

$$-10 < f1_{56}/f1 < -2 \quad (1)$$

$$5 < Vd1_1/Nd1_1 < 25 \quad (2)$$

$$15 < Vd1_4/Nd1_4 < 45 \quad (3)$$

$$5 < Vd1_6/Nd1_6 < 60 \quad (4)$$

$$-10 < (R1_{41} - R1_{42})/(R1_{41} + R1_{42}) < 18 \quad (5)$$

$$1 < (R_{51} - R1_{52})/(R1_{51} + R1_{52}) < 10 \quad (6)$$

wherein $f1_{56}$ is an effective focal length of a combination of the fifth lens L15 and the sixth lens L16, f1 is an effective focal length of the wide-angle lens 1, $Vd1_1$ is an Abbe number of the first lens L11, $Nd1_1$ is an index of refraction of the first lens L11, $Vd1_4$ is an Abbe number of the fourth lens L14, $Nd1_4$ is an index of refraction of the fourth lens L14, $Vd1_6$ is an Abbe number of the sixth lens L16, $Nd1_6$ is an index of refraction of the sixth lens L16, $R1_{41}$ is a radius of curvature of the object side surface S18 of the fourth lens L14, $R1_{42}$ is a radius of curvature of the image side surface S19 of the fourth lens L14, $R1_{51}$ is a radius of curvature of the object side surface S110 of the fifth lens L15, and $R1_{52}$ is a radius of curvature of the image side surface S111 of the fifth lens L15.

By the above design of the lenses and stop ST1, the wide-angle lens 1 is provided with a shortened total lens length, an increased field of view, an effective corrected aberration, an effective corrected chromatic aberration, a resistance to environment temperature variation and an increased resolution.

In order to achieve the above purposes and effectively enhance the optical performance, the wide-angle lens 1 in accordance with the first embodiment of the invention is provided with the optical specifications shown in Table 1, which include the effective focal length, F-number, field of view, radius of curvature of each lens surface, thickness between adjacent surface, refractive index of each lens and Abbe number of each lens. Table 1 shows that the effective focal length is equal to 2.7076 mm, F-number is equal to 2.85 and field of view is equal to 148.9° for the wide-angle lens 1 of the first embodiment of the invention.

TABLE 1

Effective Focal Length = 2.7076 mm F-number = 2.85
Field of View = 148.9°

| Surface Number | Radius of Curvature (mm) | Thickness (mm) | Nd | Vd | Remark |
| --- | --- | --- | --- | --- | --- |
| S11 | 13.451 | 0.725 | 1.806 | 40.9 | The First Lens L11 |
| S12 | 4.696 | 1.916 | | | |
| S13 | 7.285 | 0.978 | 1.809 | 40.4 | The Second Lens L12 |
| S14 | 2.238 | 1.660 | | | |
| S15 | 16.605 | 5.619 | 1.834 | 37.2 | The Third Lens L13 |
| S16 | −7.274 | 1.792 | | | |
| S17 | ∞ | −0.060 | | | Stop ST1 |
| S18 | 5.882 | 1.885 | 1.639 | 55.4 | The Fourth Lens L14 |
| S19 | −7.396 | 0.925 | | | |
| S110 | −5.493 | 0.700 | 1.762 | 26.5 | The Fifth Lens L15 |
| S111 | 3.585 | 2.231 | 1.497 | 81.5 | The Sixth Lens L16 |
| S112 | −9.915 | 0.150 | | | |
| S113 | 6.075 | 2.306 | 1.495 | 81.0 | The Seventh Lens L17 |
| S114 | −14.117 | 0.502 | | | |
| S115 | ∞ | 0.500 | 1.517 | 64.2 | Optical Filter OF1 |
| S116 | ∞ | 2.173 | | | |

The aspheric surface sag z of each lens in table 1 can be calculated by the following formula:

$$z = ch^2 / \{1 + [1 - (k+1)c^2h^2]^{1/2}\} + Ah^4 + Bh^6 + Ch^8 + Dh^{10} + Eh^{12} + Fh^{14}$$

where c is curvature, h is the vertical distance from the lens surface to the optical axis, k is conic constant and A, B, C, D, E and F are aspheric coefficients.

In the first embodiment, the conic constant k and the aspheric coefficients A, B, C, D, E, F of each surface are shown in Table 2.

TABLE 2

| Surface Number | S13 | S14 | S113 | S114 |
|---|---|---|---|---|
| k | 0.0000E+00 | −8.0150E−01 | −1.7398E+00 | 0.0000E+00 |
| A | −3.5631E−03 | −2.1755E−03 | 2.7408E−04 | 2.9458E−03 |
| B | 2.8145E−05 | −1.8533E−04 | −5.5668E−05 | −1.2089E−04 |
| C | 5.8945E−07 | 6.6918E−06 | −6.6867E−07 | −6.1697E−06 |
| D | 0.0000E+00 | 0.0000E+00 | −1.1378E−07 | 5.3667E−08 |
| E | 0.0000E+00 | 0.0000E+00 | −2.7097E−09 | 1.5205E−09 |
| F | 0.0000E+00 | 0.0000E+00 | 4.8407E−10 | 1.8162E−10 |

For the wide-angle lens 1 of the first embodiment, the effective focal length f1 of the wide-angle lens 1 is equal to 2.7076 mm, the effective focal length $f1_{56}$ of the combination of the fifth lens L15 and the sixth lens L16 is equal to −6.60210 mm, the Abbe number $Vd1_1$ of the first lens L11 is equal to 40.9, the index of refraction $Nd1_1$ of the first lens L11 is equal to 1.806, the Abbe number $Vd1_4$ of the fourth lens L14 is equal to 55.4, the index of refraction $Nd1_4$ of the fourth lens L14 is equal to 1.639, the Abbe number $Vd1_6$ of the sixth lens L16 is equal to 81.5, the index of refraction $Nd1_6$ of the sixth lens L16 is equal to 1.497, the radius of curvature $R1_{41}$ of the object side surface S18 of the fourth lens L14 is equal to 5.88224 mm, the radius of curvature $R1_{42}$ of the image side surface S19 of the fourth lens L14 is equal to −7.39603 mm, the radius of curvature $R1_{51}$ of the object side surface S110 of the fifth lens L15 is equal to −5.49285 mm, and the radius of curvature $R1_{52}$ of the image side surface S111 of the fifth lens L15 is equal to 3.58507 mm. According to the above data, the following values can be obtained:

$$f1_{56}/f1 = -2.4384$$

$$Vd1_1/Nd1_1 = 22.6599,$$

$$Vd1_4/Nd1_4 = 33.7984,$$

$$Vd1_6/Nd1_6 = 54.4729,$$

$$(R1_{41}-R1_{42})/(R1_{41}+R1_{42}) = -8.7715,$$

$$(R1_{51}-R1_{52})/(R1_{51}+R1_{52}) = 4.7584$$

which respectively satisfy the above conditions (1)-(6).

Figure 2A:
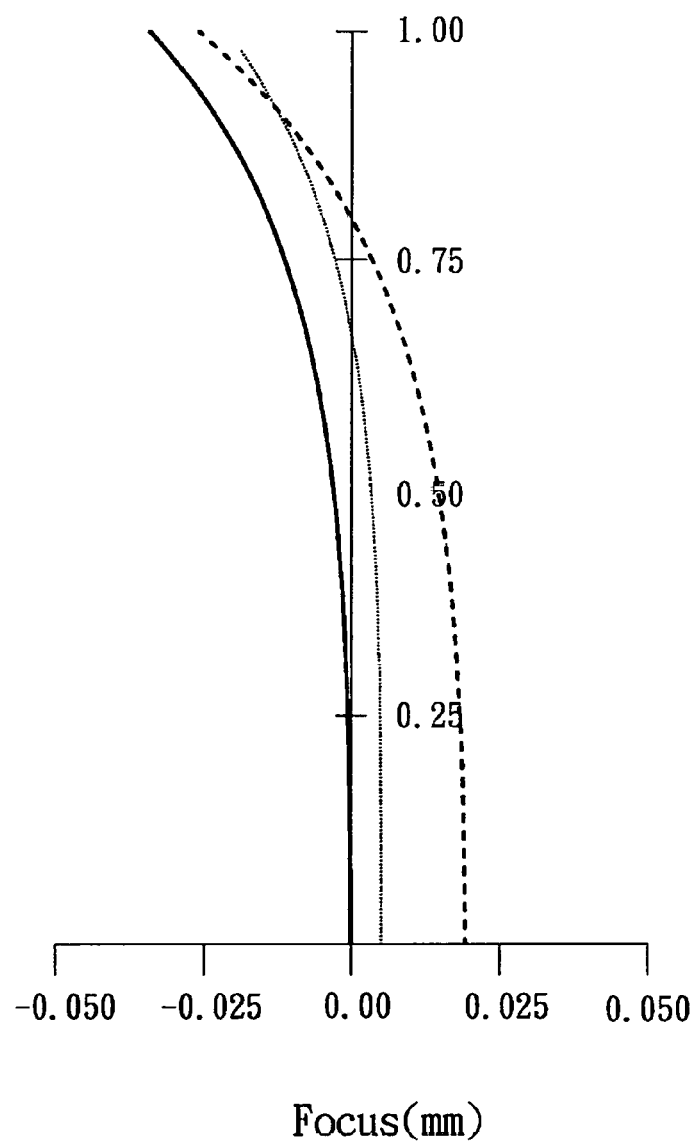
FIG. 2A depicts a longitudinal spherical aberration of the wide-angle lens in accordance with the first embodiment of the invention.
Figure 2B:
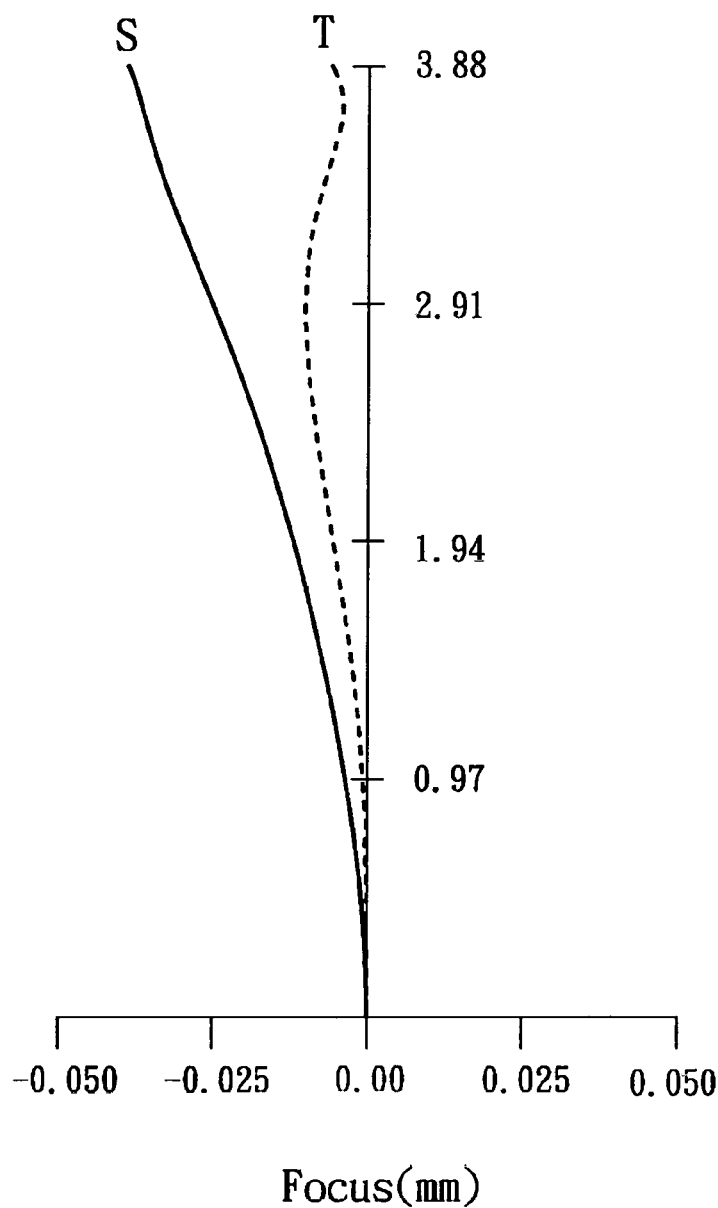
FIG. 2B is an astigmatic field curves diagram of the wide-angle lens in accordance with the first embodiment of the invention.
Figure 2C:
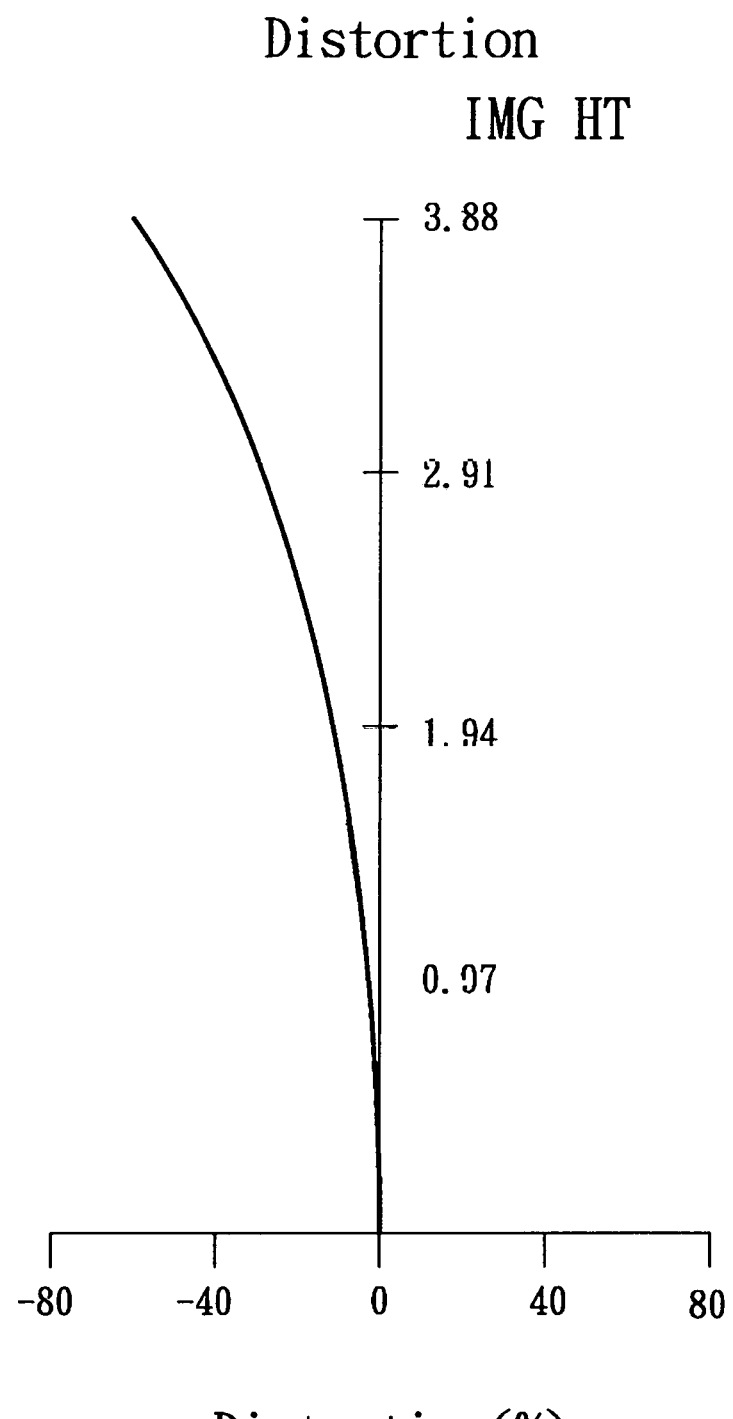
FIG. 2C is a distortion diagram of the wide-angle lens in accordance with the first embodiment of the invention.

By the above arrangements of the lenses and stop ST1, the wide-angle lens 1 of the first embodiment can meet the requirements of optical performance as seen in FIGS. 2A-2C, wherein FIG. 2A shows a longitudinal spherical aberration diagram of the wide-angle lens 1 in accordance with the first embodiment of the invention, FIG. 2B shows an astigmatic field curves of the wide-angle lens 1 in accordance with the first embodiment of the invention and FIG. 2C shows a distortion diagram of the wide-angle lens 1 in accordance with the first embodiment of the invention.

It can be seen from FIG. 2A that the longitudinal spherical aberration in the wide-angle lens 1 of the first embodiment ranges from −0.038 mm to 0.025 mm for the wavelength of 433.0000 nm, 525.0000 nm and 656.0000 nm. It can be seen from FIG. 2B that the astigmatic field curves of tangential direction and sagittal direction in the wide-angle lens 1 of the first embodiment ranges from −0.040 mm to 0.0 mm for the wavelength of 525.0000 nm. It can be seen from FIG. 2C that the distortion in the wide-angle lens 1 of the first embodiment ranges from −60% to 0% for the wavelength of 525.0000 nm. It is obvious that the longitudinal spherical aberration, the astigmatic field curves and the distortion of the wide-angle lens 1 of the first embodiment can be corrected effectively. Therefore, the wide-angle lens 1 of the first embodiment is capable of good optical performance.

Figure 3:
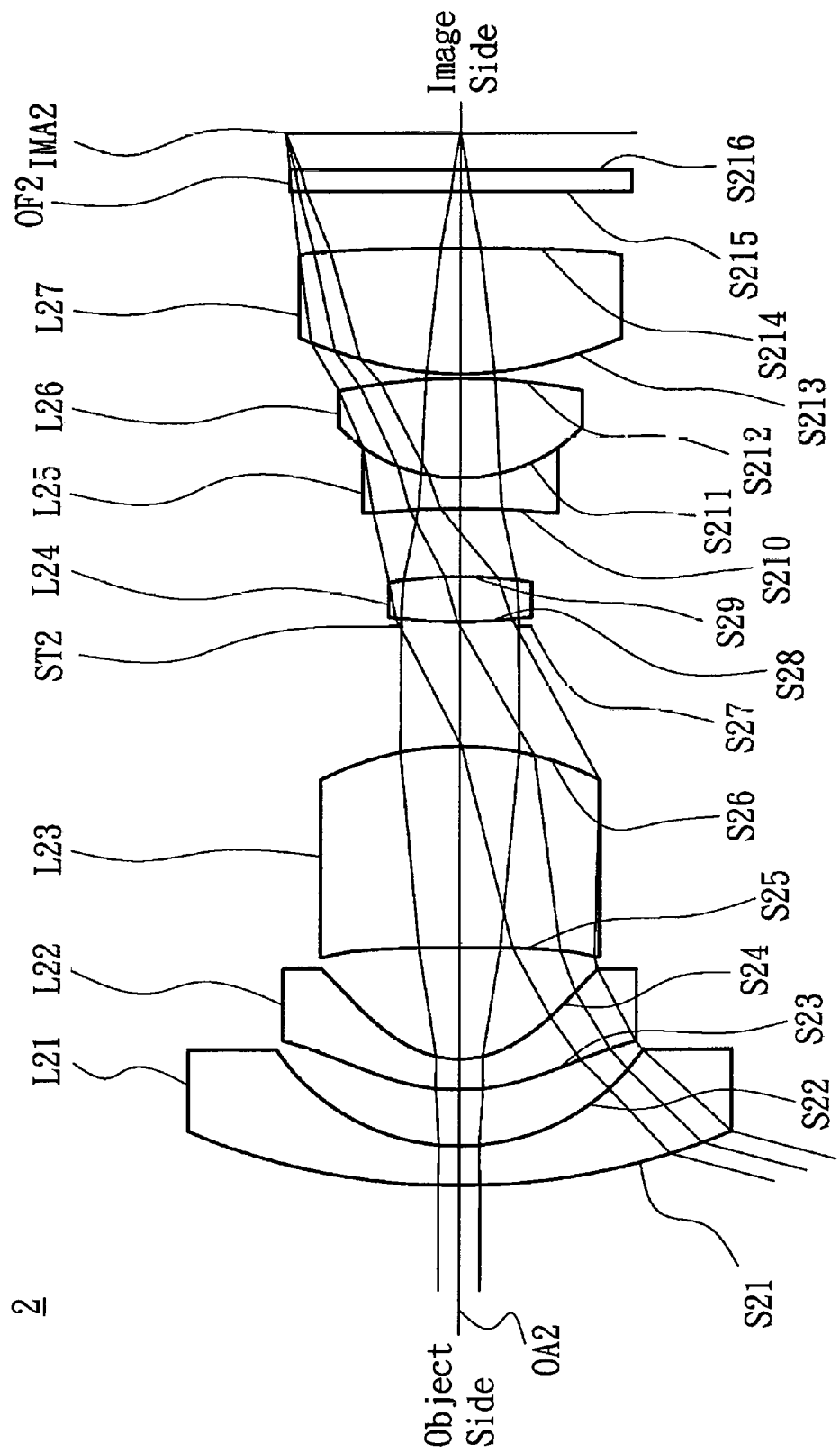
FIG. 3 is a lens layout and optical path diagram of a wide-angle lens in accordance with a second embodiment of the invention.

Referring to FIG. 3, FIG. 3 is a lens layout and optical path diagram of a wide-angle lens in accordance with a second embodiment of the invention. The wide-angle lens 2 includes a first lens L21, a second lens L22, a third lens L23, a stop ST2, a fourth lens L24, a fifth lens L25, a sixth lens L26, a seventh lens L27 and an optical filter OF2, all of which are arranged in sequence from an object side to an image side along an optical axis OA2. In operation, an image of light rays from the object side is formed at an image plane IMA2. The first lens L21 is a convex-concave lens with negative refractive power and made of glass material, wherein the object side surface S21 is a convex surface, the image side surface S22 is a concave surface and both of the object side surface S21 and image side surface S22 are spherical surfaces. The second lens L22 is a convex-concave lens with negative refractive power and made of glass material, wherein the object side surface S23 is a convex surface, the image side surface S24 is a concave surface and both of the object side surface S23 and image side surface S24 are aspheric surfaces. The third lens L23 is a concave-convex lens with positive refractive power and made of glass material, wherein the object side surface S25 is a concave surface, the image side surface S26 is a convex surface and both of the object side surface S25 and image side surface S26 are aspheric surfaces. The fourth lens L24 is a biconvex lens with positive refractive power and made of glass material, wherein both of the object side surface S28 and image side surface S29 are spherical surfaces. The fifth lens L25 is a biconcave lens with negative refractive power and made of glass material, wherein both of the object side surface S210 and image side surface S211 are spherical surfaces. The sixth lens L26 is a biconvex lens with positive refractive power and made of glass material, wherein both of the object side surface S211 and image side surface S212 are spherical surfaces. The image side surface S211 of the fifth lens L25 and the object side surface S211 of the sixth lens L26 are cemented to form a cemented lens. The seventh lens L27 is a biconvex lens with positive refractive power and made of glass material, wherein both of the object side surface S213 and image side surface S214 are aspheric surfaces. Both of the object side surface S215 and image side surface S216 of the optical filter OF2 are plane surfaces.

In order to maintain excellent optical performance of the wide-angle lens in accordance with the second embodiment of the invention, the wide-angle lens 2 must satisfies the following six conditions:

$$-10 \leq f2_{56}/f2 < -2 \quad (7)$$

$$5 < Vd2_1/Nd2_1 < 25 \quad (8)$$

$$15 < Vd2_4/Nd2_4 < 45 \quad (9)$$

$$5 < Vd2_6/Nd2_6 < 60 \quad (10)$$

$$-10 < (R2_{41}-R2_{42})/(R2_{41}+R2_{42}) < 18 \quad (11)$$

$$1 < (R2_{51}-R2_{52})/(R2_{51}+R2_{52}) < 10 \quad (12)$$

wherein $f2_{56}$ is an effective focal length of a combination of the fifth lens L25 and the sixth lens L26, f2 is an effective focal length of the wide-angle lens 2, $Vd2_1$ is an Abbe number of the first lens L21, $Nd2_1$ is an index of refraction of the first lens L21, $Vd2_4$ is an Abbe number of the fourth lens L24, $Nd2_4$ is an index of refraction of the fourth lens L24, $Vd2_6$ is an Abbe number of the sixth lens L26, $Nd2_6$ is an index of refraction of the sixth lens L26, $R2_{41}$ is a radius of curvature of the object side surface S28 of the fourth lens L24, $R2_{42}$ is a radius of curvature of the image side surface S29 of the fourth lens L24, $R2_{51}$ is a radius of curvature of the object side surface S210 of the fifth lens L25, and $R2_{52}$ is a radius of curvature of the image side surface S211 of the fifth lens L25.

By the above design of the lenses and stop ST2, the wide-angle lens 2 is provided with a shortened total lens length, an increased field of view, an effective corrected aberration, an effective corrected chromatic aberration, a resistance to environment temperature variation and an increased resolution.

In order to achieve the above purposes and effectively enhance the optical performance, the wide-angle lens 2 in accordance with the second embodiment of the invention is provided with the optical specifications shown in Table 3, which include the effective focal length, F-number, field of view, radius of curvature of each lens surface, thickness between adjacent surface, refractive index of each lens and Abbe number of each lens. Table 3 shows that the effective focal length is equal to 2.5847 mm, F-number is equal to 2.8 and field of view is equal to 149.5° for the wide-angle lens 2 of the second embodiment of the invention.

TABLE 3

Effective Focal Length = 2.5847 mm F-number = 2.8
Field of View = 149.5°

| Surface Number | Radius of Curvature (mm) | Thickness (mm) | Nd | Vd | Remark |
|---|---|---|---|---|---|
| S21 | 15.262 | 0.891 | 1.946 | 18.0 | The First Lens L21 |
| S22 | 4.826 | 1.292 | | | |
| S23 | 4.508 | 0.700 | 1.689 | 55.7 | The Second Lens L22 |
| S24 | 2.122 | 2.547 | | | |
| S25 | −58.977 | 4.591 | 1.845 | 23.6 | The Third Lens L23 |
| S26 | −6.502 | 2.738 | | | |
| S27 | ∞ | 0.100 | | | Stop ST2 |
| S28 | 11.599 | 1.025 | 1.804 | 46.6 | The Fourth Lens L24 |
| S29 | −10.234 | 1.550 | | | |
| S210 | −20.799 | 0.700 | 1.946 | 18.0 | The Fifth Lens L25 |
| S211 | 3.697 | 2.273 | 1.620 | 60.3 | The Sixth Lens L26 |
| S212 | −12.895 | 0.100 | | | |
| S213 | 6.901 | 2.866 | 1.590 | 67.8 | The Seventh Lens L27 |
| S214 | −50.304 | 1.290 | | | |
| S215 | ∞ | 0.500 | 1.517 | 64.2 | Optical Filter OF2 |
| S216 | ∞ | 0.838 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

For the wide-angle lens 2 of the second embodiment, the effective focal length f2 of the wide-angle lens 2 is equal to 2.5847 mm, the effective focal length $f2_{36}$ of the combination of the fifth lens L25 and the sixth lens L26 is equal to −12.2473 mm, the Abbe number $Vd2_1$ of the first lens L21 is equal to 18.0, the index of refraction $Nd2_1$ of the first lens L21 is equal to 1.946, the Abbe number $Vd2_4$ of the fourth lens L24 is equal to 46.6, the index of refraction $Nd2_4$ of the fourth lens L24 is equal to 1.804, the Abbe number $Vd2_6$ of the sixth lens L26 is equal to 60.3, the index of refraction $Nd2_6$ of the sixth lens L26 is equal to 1.620, the radius of curvature $R2_{41}$ of the object side surface S28 of the fourth lens L24 is equal to 11.59852 mm, the radius of curvature $R2_{42}$ of the image side surface S29 of the fourth lens L24 is equal to −10.23370 mm, the radius of curvature $R2_{51}$ of the object side surface S210 of the fifth lens L25 is equal to −20.79877 mm, and the radius of curvature $R2_{52}$ of the image side surface S211 of the fifth lens L25 is equal to 3.69686 mm. According to the above data, the following values can be obtained:

$f2_{56}/f2 = -4.7384$ $Vd2_1/Nd2_1 = 9.2419$, $Vd2_4/Nd2_4 = 25.8151$, $Vd2_6/Nd2_6 = 37.2274$, $(R2_{41} - R2_{42})/(R2_{41} + R2_{42}) = 15.9965$, $(R2_{51} - R2_{52})/(R2_{51} + R2_{52}) = 1.4323$ which respectively satisfy the above conditions (7)-(12).

Figure 4A:
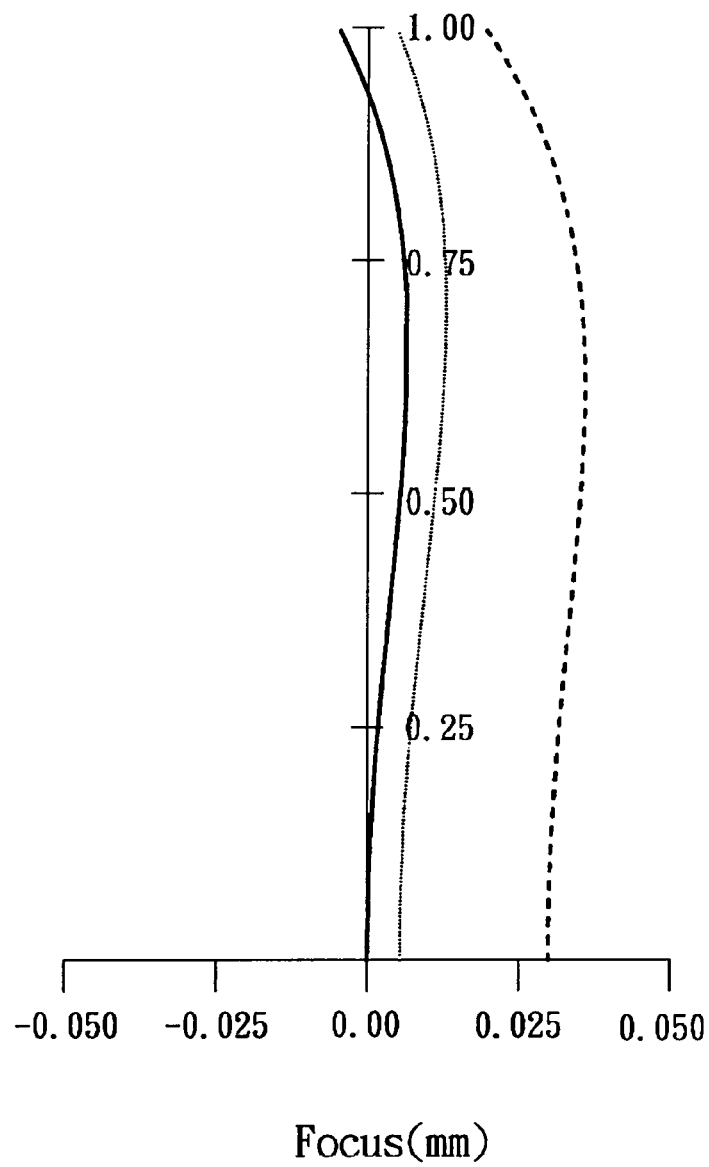
FIG. 4A depicts a longitudinal spherical aberration of the wide-angle lens in accordance with the second embodiment of the invention.
Figure 4B:
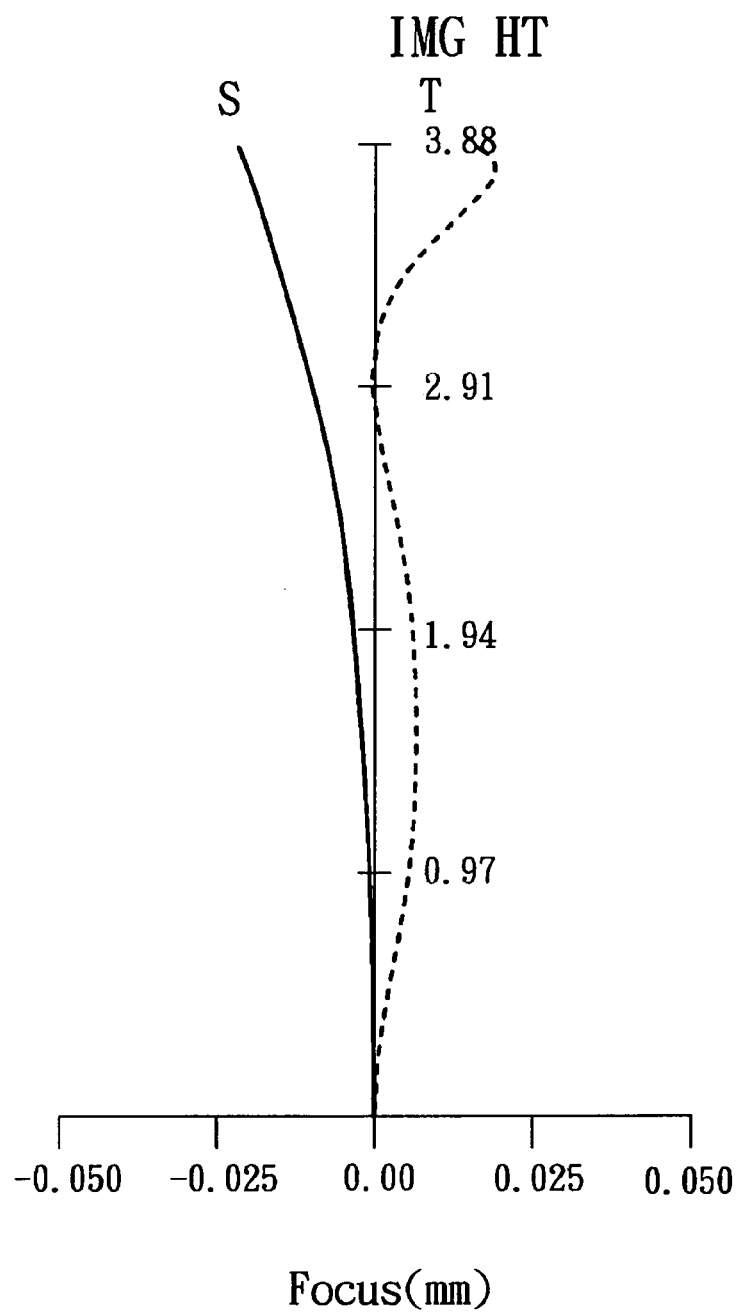
FIG. 4B is an astigmatic field curves diagram of the wide-angle lens in accordance with the second embodiment of the invention.
Figure 4C:
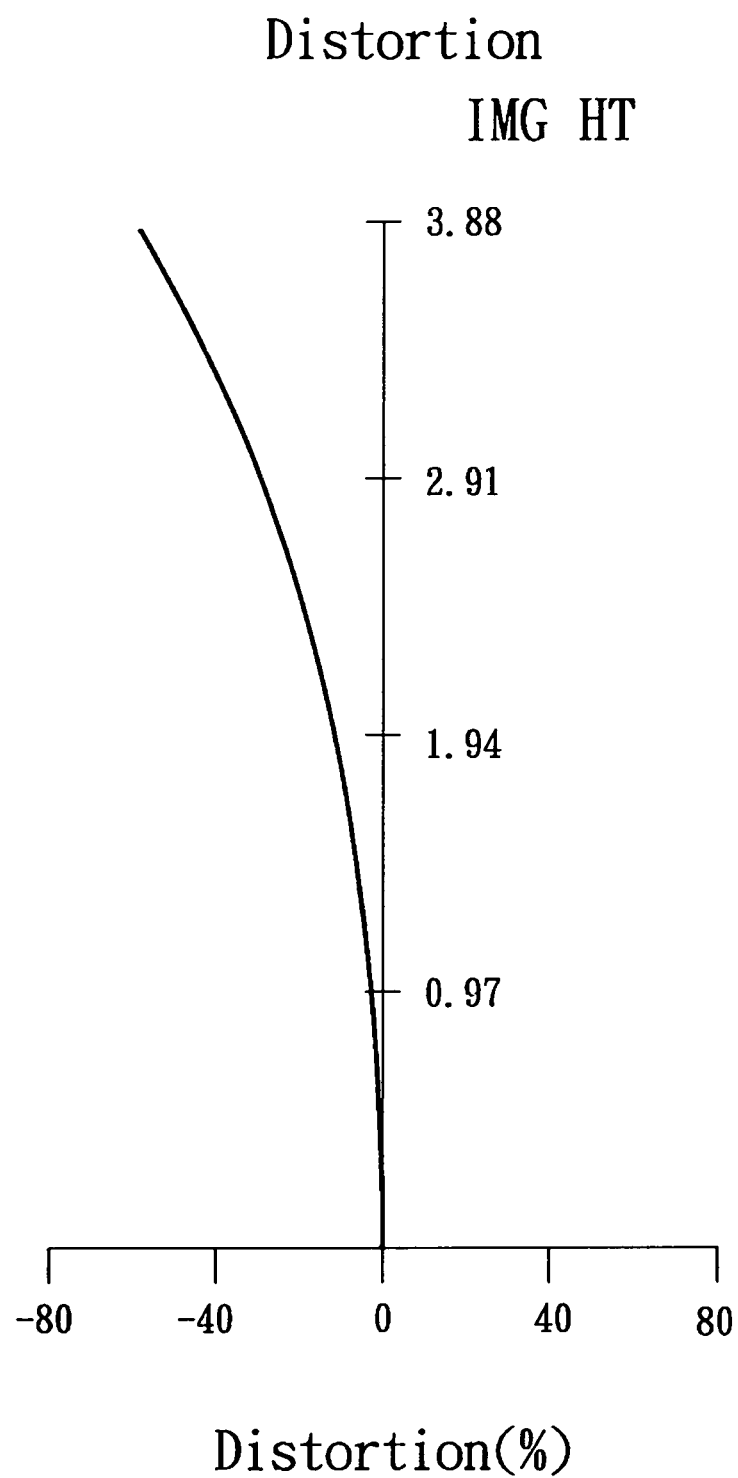
FIG. 4C is a distortion diagram of the wide-angle lens in accordance with the second embodiment of the invention.

By the above arrangements of the lenses and stop ST2, the wide-angle lens 2 of the second embodiment can meet the requirements of optical performance as seen in FIGS. 4A-4C, wherein FIG. 4A shows a longitudinal spherical aberration diagram of the wide-angle lens 2 in accordance with the second embodiment of the invention, FIG. 4B shows an astigmatic field curves of the wide-angle lens 2 in accordance with the second embodiment of the invention and FIG. 4C shows a distortion diagram of the wide-angle lens 2 in accordance with the second embodiment of the invention.

It can be seen from FIG. 4A that the longitudinal spherical aberration in the wide-angle lens 2 of the second embodiment ranges from −0.012 mm to 0.050 mm for the wavelength of 433.0000 nm, 525.0000 nm and 656.0000 nm. It can be seen from FIG. 4B that the astigmatic field curves of tangential direction and sagittal direction in the wide-angle lens 2 of the second embodiment ranges from −0.025 mm to 0.025 mm for the wavelength of 525.0000 nm. It can be seen from FIG. 4C that the distortion in the wide-angle lens 2 of the second embodiment ranges from −42% to 0% for the

TABLE 4

| Surface Number | S23 | S24 | S25 | S26 | S213 | S214 |
|---|---|---|---|---|---|---|
| k | −6.7153E−01 | −7.2050E−01 | 9.2047E+01 | −9.4196E−01 | −2.5726E+00 | −1.4440E+01 |
| A | −1.4568E−03 | −9.1417E−04 | −9.8243E−04 | −1.3107E−04 | 1.0139E−04 | 1.1978E−03 |
| B | −1.7521E−04 | −5.0037E−04 | 1.4368E−05 | −3.7994E−05 | −3.2644E−05 | −9.7322E−05 |
| C | 3.6888E−06 | −9.4244E−06 | −9.2388E−06 | 1.7528E−06 | −1.3386E−06 | −5.5090E−06 |
| D | 5.7704E−08 | −2.2029E−06 | −1.6429E−07 | −4.9129E−08 | 1.3595E−07 | 3.5471E−07 |
| E | 1.5888E−09 | 1.6854E−07 | 2.1511E−09 | 1.4625E−10 | 4.7623E−09 | −4.8850E−11 |
| F | 0.0000E+00 | 0.0000E+00 | 0.0000E+00 | 0.0000E+00 | 1.0210E−10 | 4.8662E−11 |
| G | 0.0000E+00 | 0.0000E+00 | 0.0000E+00 | 0.0000E+00 | −1.8913E−12 | 8.4777E−12 | wavelength of 525.0000 nm. It is obvious that the longitudinal spherical aberration, the astigmatic field curves and the distortion of the wide-angle lens 2 of the second embodiment can be corrected effectively. Therefore, the wide-angle lens 2 of the second embodiment is capable of good optical performance.

Figure 5:
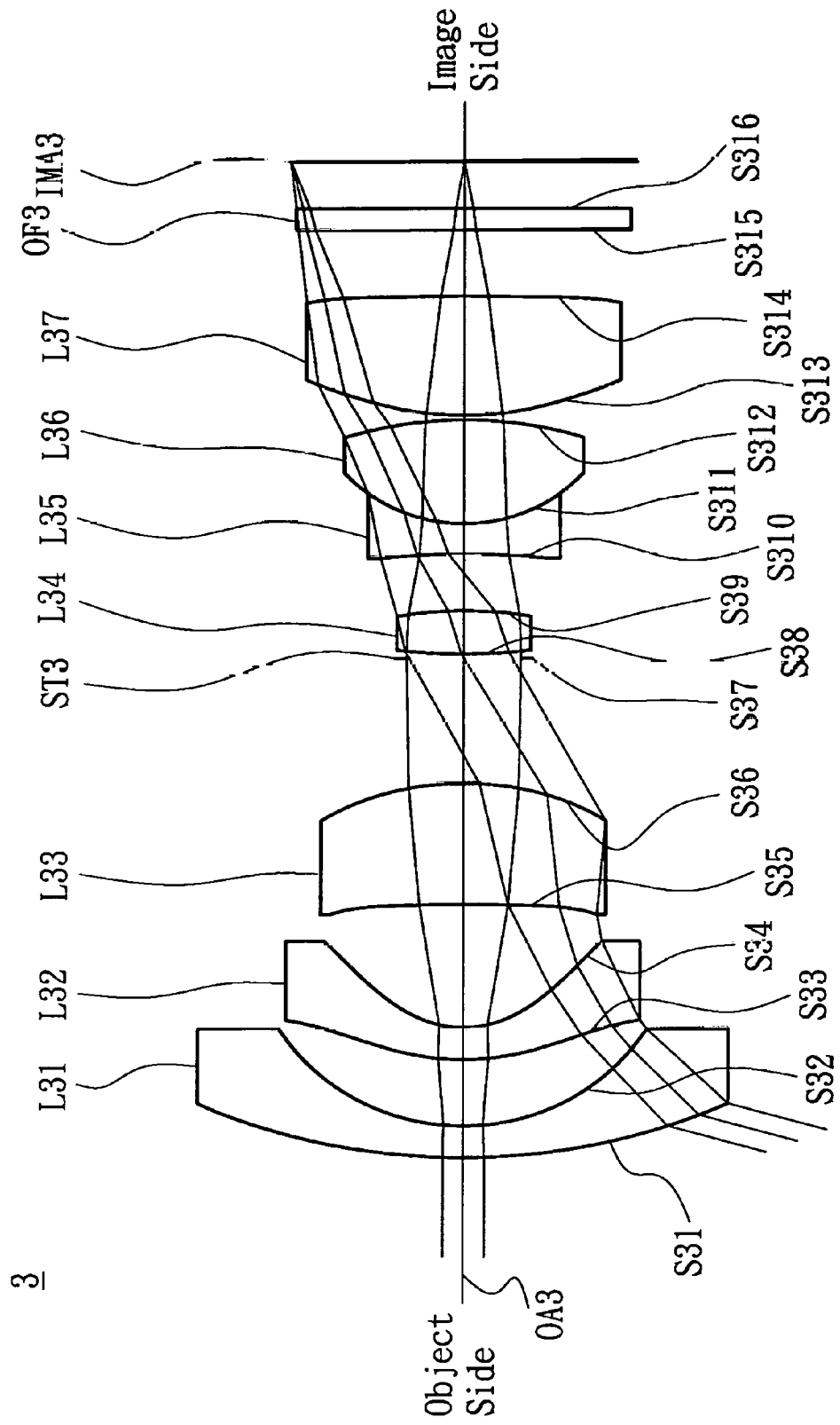
FIG. 5 is a lens layout and optical path diagram of a wide-angle lens in accordance with a third embodiment of the invention.

Referring to FIG. 5, FIG. 5 is a lens layout and optical path diagram of a wide-angle lens in accordance with a third embodiment of the invention. The wide-angle lens 3 includes a first lens L31, a second lens L32, a third lens L33, a stop ST3, a fourth lens L34, a fifth lens L35, a sixth lens L36, a seventh lens L37 and an optical filter OF3, all of which are arranged in sequence from an object side to an image side along an optical axis OA3. In operation, an image of light rays from the object side is formed at an image plane IMA3. The first lens L31 is a convex-concave lens with negative refractive power and made of glass material, wherein the object side surface S31 is a convex surface, the image side surface S32 is a concave surface and both of the object side surface S31 and image side surface S32 are spherical surfaces. The second lens L32 is a convex-concave lens with negative refractive power and made of glass material, wherein the object side surface S33 is a convex surface, the image side surface S34 is a concave surface and both of the object side surface S33 and image side surface S34 are aspheric surfaces. The third lens L33 is a concave-convex lens with positive refractive power and made of glass material, wherein the object side surface S35 is a concave surface, the image side surface S36 is a convex surface and both of the object side surface S35 and image side surface S36 are aspheric surfaces. The fourth lens L34 is a biconvex lens with positive refractive power and made of glass material, wherein both of the object side surface S38 and image side surface S39 are spherical surfaces. The fifth lens L35 is a biconcave lens with negative refractive power and made of glass material, wherein both of the object side surface S310 and image side surface S311 are spherical surfaces. The sixth lens L36 is a biconvex lens with positive refractive power and made of glass material, wherein both of the object side surface S311 and image side surface S312 are spherical surfaces. The image side surface S311 of the fifth lens L35 and the object side surface S311 of the sixth lens L36 are cemented to form a cemented lens. The seventh lens L37 is a biconvex lens with positive refractive power and made of glass material, wherein both of the object side surface S313 and image side surface 8314 are aspheric surfaces. Both of the object side surface S315 and image side surface S316 of the optical filter OF3 are plane surfaces.

In order to maintain excellent optical performance of the wide-angle lens in accordance with the third embodiment of the invention, the wide-angle lens 3 must satisfies the following six conditions:

$$-10 < f3_{56}/f3 < -2 \quad (13)$$

$$5 < Vd3_1/Nd3_1 < 25 \quad (14)$$

$$15 < Vd3_4/Nd3_4 < 45 \quad (15)$$

$$5 < Vd3_6/Nd3_6 < 60 \quad (16)$$

$$-10 < (R3_{41}-R3_{42})/(R3_{41}+R3_{42}) < 18 \quad (17)$$

$$1 < (R3_{51}-R3_{52})/(R3_{51}+R3_{52}) < 10 \quad (18)$$

wherein $f3_{56}$ is an effective focal length of a combination of the fifth lens L35 and the sixth lens L36, f3 is an effective focal length of the wide-angle lens 3, $Vd3_1$ is an Abbe number of the first lens L31, $Nd3_1$ is an index of refraction of the first lens L31, $Vd3_4$ is an Abbe number of the fourth lens L34, $Nd3_4$ is an index of refraction of the fourth lens L34, $Vd3_6$ is an Abbe number of the sixth lens L36, $Nd3_6$ is an index of refraction of the sixth lens L36, $R3_{41}$ is a radius of curvature of the object side surface S38 of the fourth lens L34, $R3_{42}$ is a radius of curvature of the image side surface S39 of the fourth lens L34, $R3_{51}$ is a radius of curvature of the object side surface S310 of the fifth lens L35, and $R3_{52}$ is a radius of curvature of the image side surface S311 of the fifth lens L35.

By the above design of the lenses and stop ST3, the wide-angle lens 3 is provided with a shortened total lens length, an increased field of view, an effective corrected aberration, an effective corrected chromatic aberration, a resistance to environment temperature variation and an increased resolution.

In order to achieve the above purposes and effectively enhance the optical performance, the wide-angle lens 3 in accordance with the third embodiment of the invention is provided with the optical specifications shown in Table 5, which include the effective focal length, F-number, field of view, radius of curvature of each lens surface, thickness between adjacent surface, refractive index of each lens and Abbe number of each lens. Table 5 shows that the effective focal length is equal to 2.6030 mm, F-number is equal to 2.8 and field of view is equal to 149.5° for the wide-angle lens 3 of the third embodiment of the invention.

TABLE 5

| Effective Focal Length = 2.6030 mm F-number = 2.8 Field of View = 149.5° | | | | | |
|---|---|---|---|---|---|
| Surface Number | Radius of Curvature (mm) | Thickness (mm) | Nd | Vd | Remark |
| S31 | 14.802 | 0.728 | 1.957 | 13.8 | The First Lens L31 |
| S32 | 4.912 | 1.533 | | | |
| S33 | 5.221 | 0.743 | 1.695 | 49.1 | The Second Lens L32 |
| S34 | 2.238 | 2.852 | | | |
| S35 | −65.140 | 2.800 | 1.877 | 17.4 | The Third Lens L33 |
| S36 | −6.669 | 2.893 | | | |
| S37 | ∞ | 0.100 | | | Stop ST3 |
| S38 | 13.110 | 1.000 | 1.758 | 29.3 | The Fourth Lens L34 |
| S39 | −9.128 | 1.311 | | | |
| S310 | −18.048 | 0.700 | 1.873 | 15.0 | The Fifth Lens L35 |
| S311 | 3.650 | 2.397 | 1.625 | 59.3 | The Sixth Lens L36 |
| S312 | −9.113 | 0.100 | | | |
| S313 | 6.694 | 2.759 | 1.487 | 70.4 | The Seventh Lens L37 |
| S314 | −65.342 | 1.527 | | | |
| S315 | ∞ | 0.500 | 1.517 | 64.2 | Optical Filter OF3 |
| S316 | ∞ | 1.076 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 6.

TABLE 6

| Surface Number | S33 | S34 | S35 | S36 | S313 | S314 |
|---|---|---|---|---|---|---|
| k | −6.0910E−01 | −7.1276E−01 | 1.0992E+02 | −6.3740E−01 | −2.3443E+00 | 5.0867E+00 |
| A | −1.4710E−03 | −8.7625E−04 | −9.5594E−04 | −2.6332E−04 | 1.1968E−04 | 1.2028E−03 |
| B | −1.5500E−04 | −4.4837E−04 | −8.1392E−06 | −5.6309E−05 | −4.0779E−05 | −1.1506E−04 |
| C | 4.5640E−06 | −6.1467E−06 | −8.9345E−06 | 6.4620E−07 | −2.7012E−06 | −6.4554E−06 |
| D | −1.5234E−08 | −2.1757E−06 | −3.0498E−07 | −5.0840E−08 | 2.6345E−07 | 4.4044E−07 |
| E | 1.5888E−09 | 1.6854E−07 | 2.1511E−09 | 1.4625E−10 | 4.7623E−09 | −4.8850E−11 |
| F | 0.0000E+00 | 0.0000E+00 | 0.0000E+00 | 0.0000E+00 | 1.0210E−10 | 4.8662E−11 |
| G | 0.0000E+00 | 0.0000E+00 | 0.0000E+00 | 0.0000E+00 | −1.8913E−12 | 8.4777E−12 |

For the wide-angle lens 3 of the third embodiment, the effective focal length f3 of the wide-angle lens 3 is equal to 2.6030 mm, the effective focal length $f3_{56}$ of the combination of the fifth lens L35 and the sixth lens L36 is equal to −24.35090 mm, the Abbe number $Vd3_1$ of the first lens L31 is equal to 13.8, the index of refraction $Nd3_1$ of the first lens L31 is equal to 1.957, the Abbe number $Vd3_4$ of the fourth lens L34 is equal to 29.3, the index of refraction $Nd3_4$ of the fourth lens L34 is equal to 1.758, the Abbe number $Vd3_6$ of the sixth lens L36 is equal to 59.3, the index of refraction $Nd3_6$ of the sixth lens L36 is equal to 1.625, the radius of curvature $R3_{41}$ of the object side surface S38 of the fourth lens L34 is equal to 13.11001 mm, the radius of curvature $R3_{42}$ of the image side surface S39 of the fourth lens L34 is equal to −9.12805 mm, the radius of curvature $R3_{51}$ of the object side surface S310 of the fifth lens L35 is equal to −18.04844 mm, and the radius of curvature $R3_{52}$ of the image side surface S311 of the fifth lens L35 is equal to 3.64958 mm. According to the above data, the following values can be obtained:

$$f3_{56}/f3 = -9.3551$$

$$Vd3_1/Nd3_1 = 7.0377,$$

$$Vd3_4/Nd3_4 = 16.6507,$$

$$Vd3_6/Nd3_6 = 36.4651,$$

$$(R3_{41}-R3_{42})/(R3_{41}+R3_{42}) = 5.5847,$$

$$(R3_{51}-R3_{52})/(R3_{51}+R3_{52}) = 1.5069$$

which respectively satisfy the above conditions (13)-(18).

Figure 6A:
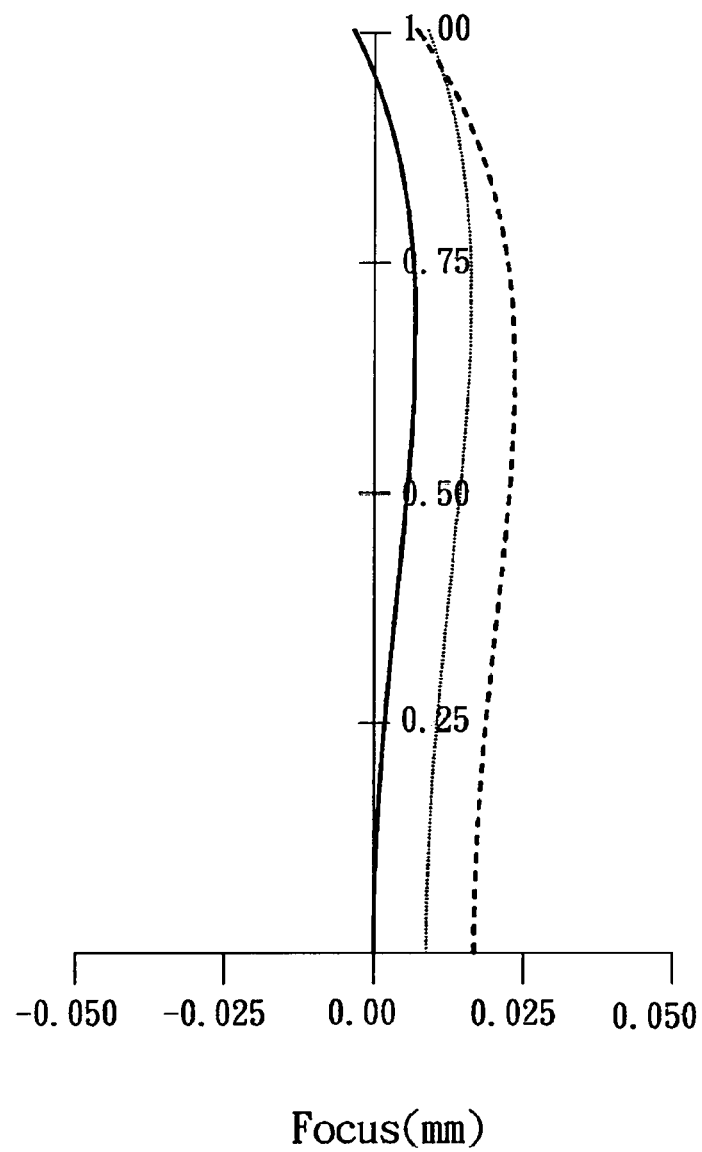
FIG. 6A depicts a longitudinal spherical aberration of the wide-angle lens in accordance with the third embodiment of the invention.
Figure 6B:
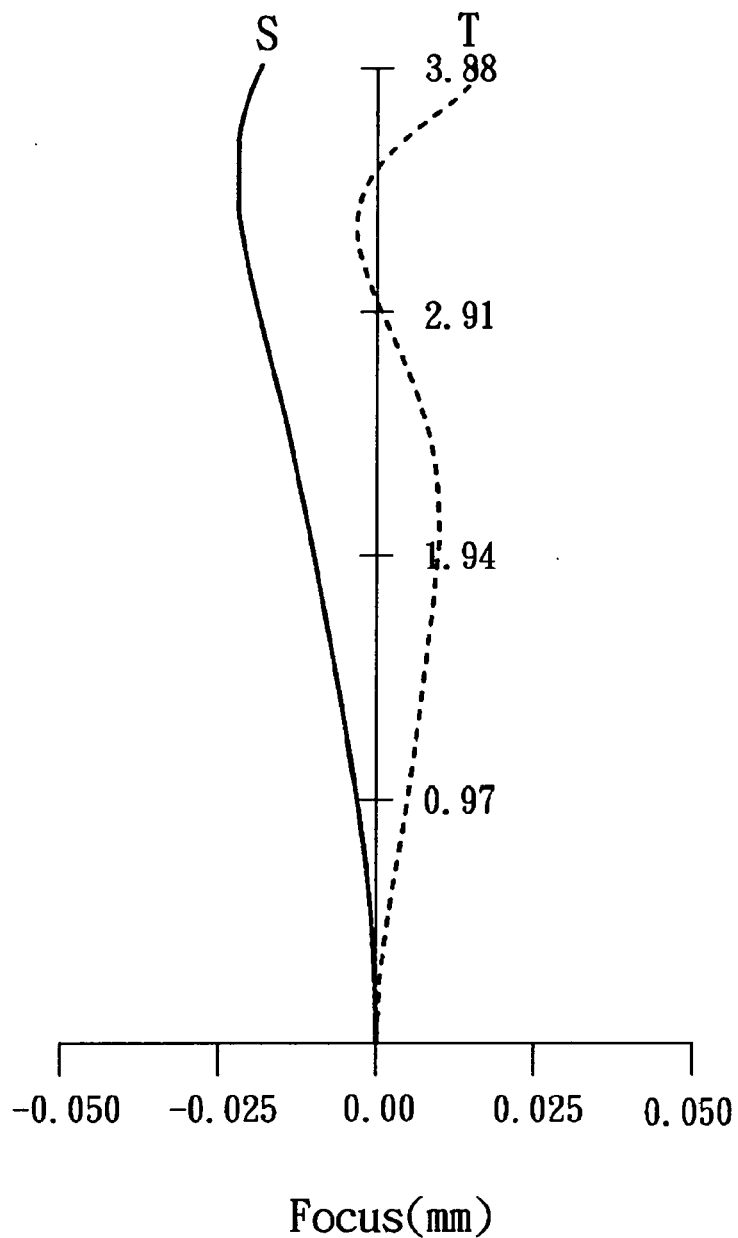
FIG. 6B is an astigmatic field curves diagram of the wide-angle lens in accordance with the third embodiment of the invention.
Figure 6C:
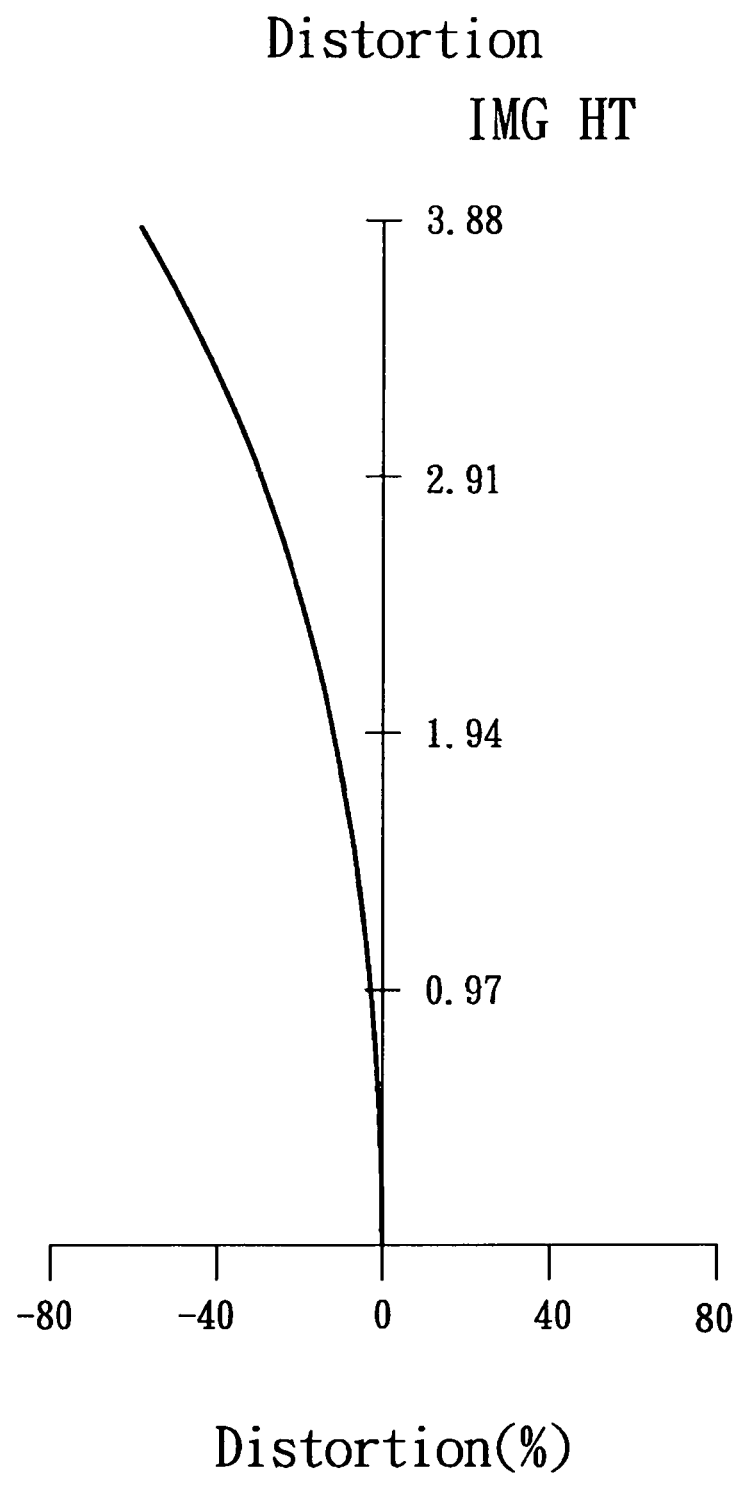
FIG. 6C is a distortion diagram of the wide-angle lens in accordance with the third embodiment of the invention.

By the above arrangements of the lenses and stop ST3, the wide-angle lens 3 of the third embodiment can meet the requirements of optical performance as seen in FIGS. 6A-6C, wherein FIG. 6A shows a longitudinal spherical aberration diagram of the wide-angle lens 3 in accordance with the third embodiment of the invention, FIG. 6B shows an astigmatic field curves of the wide-angle lens 3 in accordance with the third embodiment of the invention and FIG. 6C shows a distortion diagram of the wide-angle lens 3 in accordance with the third embodiment of the invention.

It can be seen from FIG. 6A that the longitudinal spherical aberration in the wide-angle lens 3 of the third embodiment ranges from −0.012 mm to 0.025 mm for the wavelength of 433.0000 nm, 525.0000 nm and 656.0000 nm. It can be seen from FIG. 6B that the astigmatic field curves of tangential direction and sagittal direction in the wide-angle lens 3 of the third embodiment ranges from −0.025 mm to 0.012 mm for the wavelength of 525.0000 nm. It can be seen from FIG. 6C that the distortion in the wide-angle lens 3 of the third embodiment ranges from −42% to 0% for the wavelength of 525.0000 nm. It is obvious that the longitudinal spherical aberration, the astigmatic field curves and the distortion of the wide-angle lens 3 of the third embodiment can be corrected effectively. Therefore, the wide-angle lens 3 of the third embodiment is capable of good optical performance.

Figure 7:
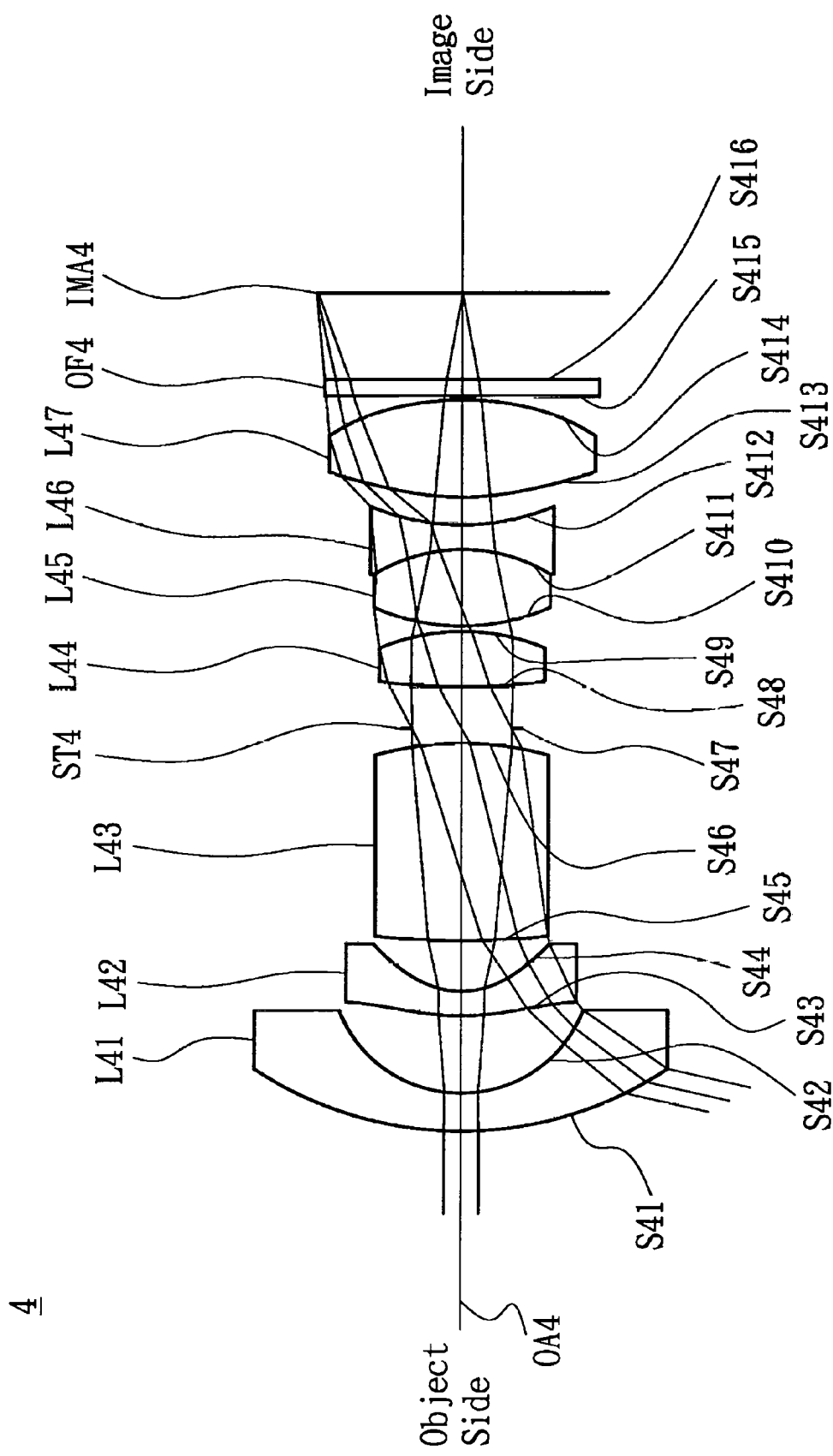
FIG. 7 is a lens layout and optical path diagram of a wide-angle lens in accordance with a fourth embodiment of the invention.

Referring to FIG. 7, FIG. 7 is a lens layout and optical path diagram of a wide-angle lens in accordance with a fourth embodiment of the invention. The wide-angle lens 4 includes a first lens L41, a second lens L42, a third lens L43, a stop ST4, a fourth lens L44, a fifth lens L45, a sixth lens L46, a seventh lens L47 and an optical filter OF4, all of which are arranged in sequence from an object side to an image side along an optical axis OA4. In operation, an image of light rays from the object side is formed at an image plane IMA4. The first lens L41 is a convex-concave lens with negative refractive power and made of glass material, wherein the object side surface S41 is a convex surface, the image side surface S42 is a concave surface and both of the object side surface S41 and image side surface S42 are spherical surfaces. The second lens L42 is a convex-concave lens with negative refractive power and made of glass material, wherein the object side surface S43 is a convex surface, the image side surface S44 is a concave surface and both of the object side surface S43 and image side surface S44 are aspheric surfaces. The third lens L43 is a biconvex lens with positive refractive power and made of glass material, wherein both of the object side surface S45 and image side surface S46 are spherical surfaces. The fourth lens L44 is a biconvex lens with positive refractive power and made of glass material, wherein both of the object side surface S48 and image side surface S49 are spherical surfaces. The fifth lens L45 is a biconvex lens with positive refractive power and made of glass material, wherein both of the object side surface S410 and image side surface S411 are spherical surfaces. The sixth lens L46 is a biconcave lens with negative refractive power and made of glass material, wherein both of the object side surface S411 and image side surface S412 are spherical surfaces. The image side surface S411 of the fifth lens L45 and the object side surface S411 of the sixth lens L46 are cemented to form a cemented lens. The seventh lens L47 is a biconvex lens with positive refractive power and made of glass material, wherein both of the object side surface S413 and image side surface S414 are aspheric surfaces. Both of the object side surface S415 and image side surface S416 of the optical filter OF4 are plane surfaces.

In order to maintain excellent optical performance of the wide-angle lens in accordance with the fourth embodiment of the invention, the wide-angle lens 4 must satisfies the following six conditions:

$$-10 < f4_{56}/f4 < -2 \qquad (19)$$

$$5 < Vd4_1/Nd4_1 < 25 \qquad (20)$$

$$15 < Vd4_4/Nd4_4 < 45 \qquad (21)$$

$$5 < Vd4_6/Nd4_6 < 60 \quad (22)$$

$$-10 < (R4_{41} - R4_{42})/(R4_{41} + R4_{42}) < 18 \quad (23)$$

$$1 < (R4_{51} - R4_{52})/(R4_{51} + R4_{51}) < 10 \quad (24)$$

wherein $f4_{56}$ is an effective focal length of a combination of the fifth lens L45 and the sixth lens L46, f4 is an effective focal length of the wide-angle lens 4, $Vd4_1$ is an Abbe number of the first lens L41, $Nd4_1$ is an index of refraction of the first lens L41, $Vd4_4$ is an Abbe number of the fourth lens L44, $Nd4_4$ is an index of refraction of the fourth lens L44, $Vd4_6$ is an Abbe number of the sixth lens L46, $Nd4_6$ is an index of refraction of the sixth lens L46, $R4_{41}$ is a radius of curvature of the object side surface S48 of the fourth lens L44, $R4_{42}$ is a radius of curvature of the image side surface S49 of the fourth lens L44, $R4_{51}$ is a radius of curvature of the object side surface S410 of the fifth lens L45, and $R4_{52}$ is a radius of curvature of the image side surface S411 of the fifth lens L45.

By the above design of the lenses and stop ST4, the wide-angle lens 4 is provided with a shortened total lens length, an increased field of view, an effective corrected aberration, an effective corrected chromatic aberration, a resistance to environment temperature variation and an increased resolution.

In order to achieve the above purposes and effectively enhance the optical performance, the wide-angle lens 4 in accordance with the fourth embodiment of the invention is provided with the optical specifications shown in Table 7, which include the effective focal length, F-number, field of view, radius of curvature of each lens surface, thickness between adjacent surface, refractive index of each lens and Abbe number of each lens. Table 7 shows that the effective focal length is equal to 2.7988 mm, F-number is equal to 2.8 and field of view is equal to 149.1° for the wide-angle lens 4 of the fourth embodiment of the invention.

TABLE 7

Effective Focal Length = 2.7988 mm F-number = 2.8
Field of View = 149.1°

| Surface Number | Radius of Curvature (mm) | Thickness (mm) | Nd | Vd | Remark |
|---|---|---|---|---|---|
| S41 | 13.817 | 1.086 | 1.946 | 18.0 | The First Lens L41 |
| S42 | 4.478 | 2.216 | | | |
| S43 | 6.552 | 0.702 | 1.589 | 61.2 | The Second Lens L42 |
| S44 | 2.206 | 1.446 | | | |
| S45 | 19.098 | 5.649 | 1.923 | 20.9 | The Third Lens L43 |
| S46 | −7.786 | 0.432 | | | |
| S47 | ∞ | 1.195 | | | Stop ST4 |
| S48 | 17.409 | 1.589 | 1.593 | 68.6 | The Fourth Lens L44 |
| S49 | −5.806 | 0.150 | | | |
| S410 | 5.880 | 2.203 | 1.497 | 81.5 | The Fifth Lens L45 |
| S411 | −3.761 | 0.700 | 1.923 | 20.9 | The Sixth Lens L46 |
| S412 | 5.801 | 0.786 | | | |
| S413 | 6.216 | 2.783 | 1.589 | 61.2 | The Seventh Lens L47 |
| S414 | −6.307 | 0.100 | | | |
| S415 | ∞ | 0.500 | 1.517 | 64.2 | Optical Filter OF4 |
| S416 | ∞ | 2.463 | | | |

The aspheric surface sag z of each lens in table 7 can be calculated by the following formula:

$$z = ch^2 / \{1 + [1-(k+1)c^2h^2]^{1/2}\} + Ah^4 + Bh^6 + Ch^8$$

where c is curvature, h is the vertical distance from the lens surface to the optical axis, k is conic constant and A, B and C are aspheric coefficients.

In the fourth embodiment, the conic constant k and the aspheric coefficients A, B, C of each surface are shown in Table 8.

TABLE 8

| Surface Number | S43 | S44 | S413 | S414 |
|---|---|---|---|---|
| k | 0.0000E+00 | 0.0000E+00 | 0.0000E+00 | 0.0000E+00 |
| A | −5.2547E−03 | 1.1916E−02 | −1.2592E−03 | −4.3325E−04 |
| B | 2.2903E−04 | −9.9108E−04 | 1.5894E−04 | −6.5861E−07 |
| C | −8.3647E−08 | 4.8472E−05 | −3.1251E−05 | 3.8748E−08 |

For the wide-angle lens 4 of the fourth embodiment, the effective focal length f4 of the wide-angle lens 4 is equal to 2.7988 mm, the effective focal length $f4_{56}$ of the combination of the fifth lens L45 and the sixth lens L46 is equal to −6.5741 mm, the Abbe number $Vd4_1$ of the first lens L41 is equal to 17.9843, the index of refraction $Nd4_1$ of the first lens L41 is equal to 1.9459, the Abbe number $Vd4_4$ of the fourth lens L44 is equal to 68.6244, the index of refraction $Nd4_4$ of the fourth lens L44 is equal to 1.5928, the Abbe number $Vd4_6$ of the sixth lens L46 is equal to 20.8835, the index of refraction $Nd4_6$ of the sixth lens L46 is equal to 1.9229, the radius of curvature $R4_{41}$ of the object side surface S48 of the fourth lens L44 is equal to 17.4089 mm, the radius of curvature $R4_{42}$ of the image side surface S49 of the fourth lens L44 is equal to −5.8057 mm, the radius of curvature $R4_{51}$ of the object side surface S410 of the fifth lens L45 is equal to 5.8796 mm, and the radius of curvature $R4_{52}$ of the image side surface S411 of the fifth lens L45 is equal to −4.5533 mm. According to the above data, the following values can be obtained:

$$f4_{56}/f4 = -2.3489$$

$$Vd4_1/Nd4_1 = 9.2419,$$

$$Vd4_4/Nd4_4 = 43.0835,$$

$$Vd4_6/Nd4_6 = 10.8607,$$

$$(R4_{41} - R4_{42})/(R4_{41} + R4_{42}) = 2.0007,$$

$$(R4_{51} - R4_{52})/(R4_{51} + R4_{52}) = 7.8662$$

which respectively satisfy the above conditions (19)-(24).

Figure 8A:
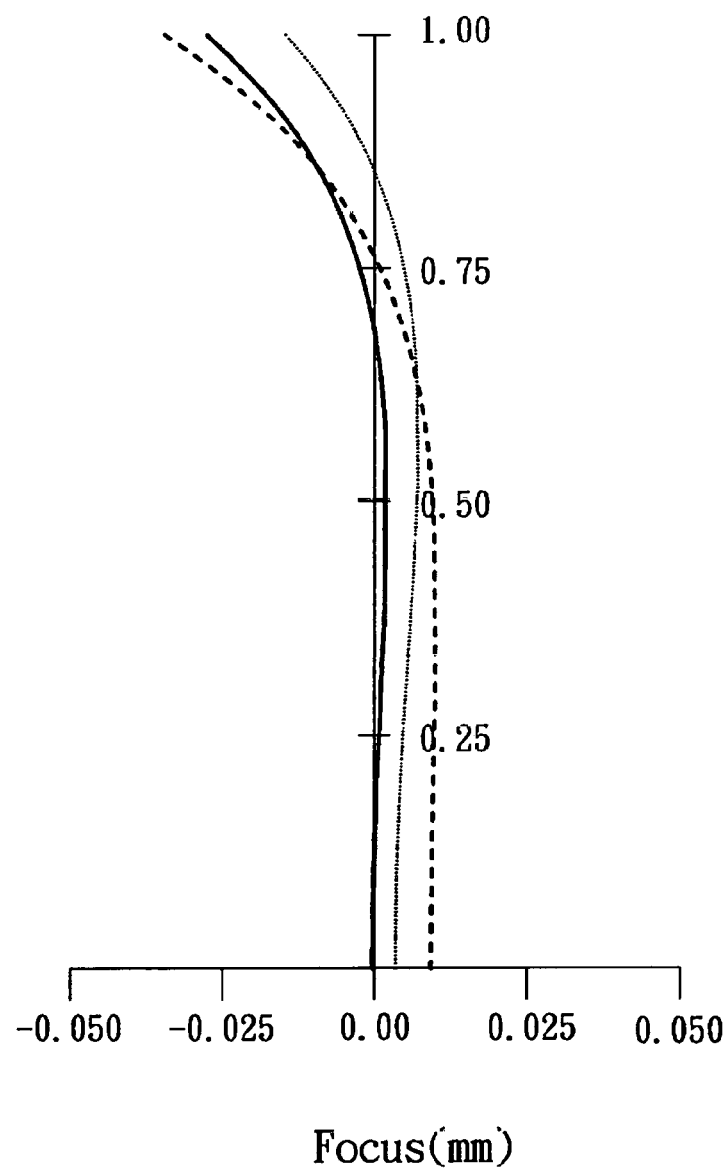
FIG. 8A depicts a longitudinal spherical aberration of the wide-angle lens in accordance with the fourth embodiment of the invention.
Figure 8B:
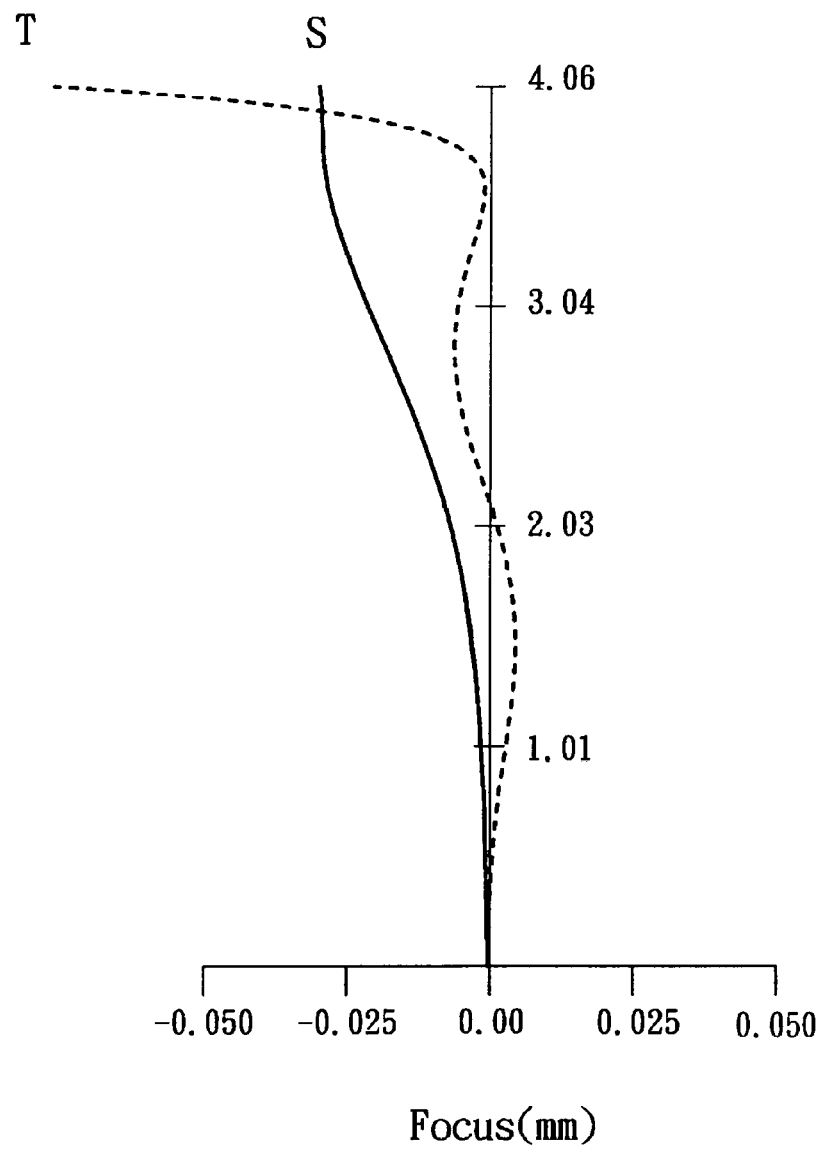
FIG. 8B is an astigmatic field curves diagram of the wide-angle lens in accordance with the fourth embodiment of the invention.
Figure 8C:
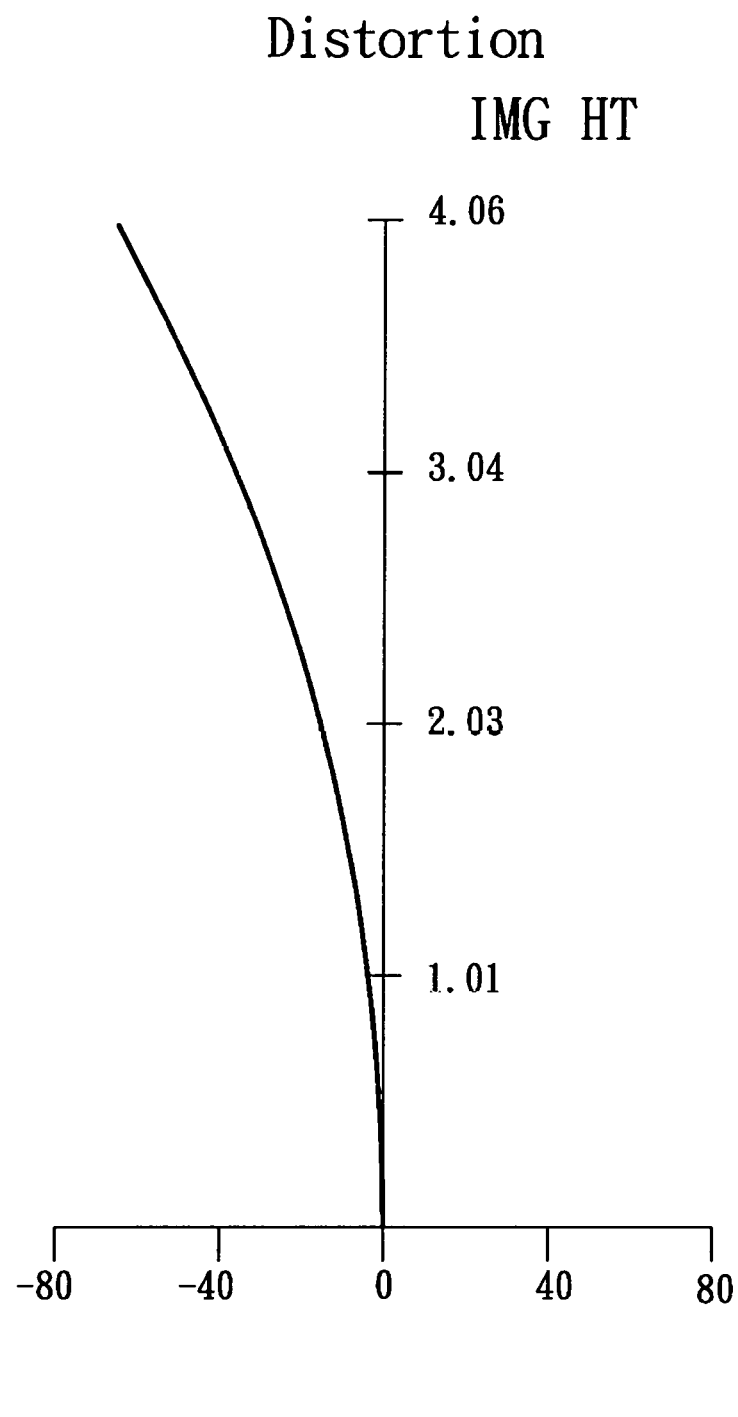
FIG. 8C is a distortion diagram of the wide-angle lens in accordance with the fourth embodiment of the invention.

By the above arrangements of the lenses and stop ST4, the wide-angle lens 4 of the fourth embodiment can meet the requirements of optical performance as seen in FIGS. 8A-8C, wherein FIG. 8A shows a longitudinal spherical aberration diagram of the wide-angle lens 4 in accordance with the fourth embodiment of the invention, FIG. 8B shows an astigmatic field curves of the wide-angle lens 4 in accordance with the fourth embodiment of the invention and FIG. 8C shows a distortion diagram of the wide-angle lens 4 in accordance with the fourth embodiment of the invention.

It can be seen from FIG. 8A that the longitudinal spherical aberration in the wide-angle lens 4 of the fourth embodiment ranges from −0.038 mm to 0.013 mm for the wavelength of 433.0000 nm, 525.0000 nm and 656.0000 nm. It can be seen from FIG. 8B that the astigmatic field curves of tangential direction and sagittal direction in the wide-angle lens 4 of the fourth embodiment ranges from −0.077 mm to 0.005 mm for the wavelength of 525.0000 nm. It can be seen from FIG. 8C that the distortion in the wide-angle lens 4 of the fourth embodiment ranges from −67% to 0% for the wavelength of 525.0000 nm. It is obvious that the longitudinal spherical aberration, the astigmatic field curves and the distortion of the wide-angle lens 4 of the fourth embodiment can be corrected effectively. Therefore, the wide-angle lens 4 of the fourth embodiment is capable of good optical performance.

What is claimed is:

1. A wide-angle lens comprising a first lens, a second lens, a third lens, a fourth lens, a fifth lens, a sixth lens and a seventh lens, all of which are arranged in sequence from an object side to an image side along an optical axis, wherein:
   the first lens is a convex-concave lens with negative refractive power and comprises a convex surface facing the object side and a concave surface facing the image side;
   the second lens is a convex-concave lens with negative refractive power and comprises a convex surface facing the object side and a concave surface facing the image side;
   the third lens is with positive refractive power and comprises a convex surface facing the image side;
   the fourth lens is a biconvex lens with positive refractive power;
   the fifth lens is with refractive power,
   the sixth lens is with refractive power;
   the seventh lens is a biconvex lens with positive refractive power; and
   the fifth lens and the sixth lens satisfy:

$$-10 < f_{56}/f < -2$$

wherein $f_{56}$ is an effective focal length of a combination of the fifth lens and the sixth lens, and f is an effective focal length of the wide-angle lens.

2. The wide-angle lens as claimed in claim 1, wherein the fifth lens and the sixth lens are cemented to form a cemented lens.

3. The wide-angle lens as claimed in claim 1, wherein the first lens satisfies:

$$5 < Vd_1/Nd_1 < 25$$

wherein $Vd_1$ is an Abbe number of the first lens and $Nd_1$ is an index of refraction of the first lens.

4. The wide-angle lens as claimed in claim 1, wherein the fourth lens satisfies:

$$15 < Vd_4/Nd_4 < 45$$

wherein $Vd_4$ is an Abbe number of the fourth lens and $Nd_4$ is an index of refraction of the fourth lens.

5. The wide-angle lens as claimed in claim 1, wherein the sixth lens satisfies:

$$5 < Vd_6/Nd_6 < 60$$

wherein $Vd_6$ is an Abbe number of the sixth lens and $Nd_6$ is an index of refraction of the sixth lens.

6. The wide-angle lens as claimed in claim 1, wherein the fourth lens satisfies:

$$-10 < (R_{41} - R_{42})/(R_{41} + R_{42}) < 18$$

wherein $R_{41}$ is a radius of curvature of an object side surface of the fourth lens and $R_{42}$ is a radius of curvature of an image side surface of the fourth lens.

7. The wide-angle lens as claimed in claim 1, wherein the fifth lens satisfies:

$$1 < (R_{51} - R_{52})/(R_{51} + R_{52}) < 10$$

wherein $R_{51}$ is a radius of curvature of an object side surface of the fifth lens and $R_{52}$ is a radius of curvature of an image side surface of the fifth lens.

8. The wide-angle lens as claimed in claim 1, wherein the first lens, the second lens, the third lens, the fourth lens, the fifth lens, the sixth lens and the seventh lens are made of glass material.

9. The wide-angle lens as claimed in claim 1, further comprising a stop disposed between the third lens and the fourth lens.

10. The wide-angle lens as claimed in claim 1, wherein the fifth lens is a biconvex lens with positive refractive power and the sixth lens is a biconcave lens with negative refractive power.

11. The wide-angle lens as claimed in claim 1, wherein the fifth lens is a biconcave lens with negative refractive power and the sixth lens is a biconvex lens with positive refractive power.

* * * * *